United States Patent Office 3,251,814
Patented May 17, 1966

3,251,814
PARTICULATE WATER-SOLUBLE ACRYLAMIDE COPOLYMERS CONTAINING COMPLEXED TRIVALENT CHROMIUM
Anthony Joseph Gentile, Albuquerque, N. Mex., assignor to American Cyanamid Company, Stamford, Conn., a corporation of Maine
No Drawing. Filed Jan. 29, 1965, Ser. No. 429,150
6 Claims. (Cl. 260—80.3)

This is a continuation-in-part of my copending application Serial No. 44,572 filed on July 22, 1960, now U.S. Patent No. 3,114,651 and of my application Serial No. 93,861, now abandoned.

The present invention relates to dry particulate polyacrylamides of more rapid dispersibility in water resulting from decreased tendency to clump together when poured into a body of water. The invention includes the improved polyacrylamides themselves and methods for their preparation.

The hydrophilic polyacrylamides (polyacrylamide and hydrophilic copolymers of acrylamide containing more than 85% by weight of combined acrylamide) are high melting point solids which are difficult to dissolve in hot water even when finely ground. Evidently this is a consequence of the fact that the particles become gelatinous and clump together like tapioca when wet with water so that their surface area is greatly diminished. These polyacrylamides are widely used as thickeners, binders, flocculants, paper strengthening agents, etc. in aqueous systems, and their slowness to dissolve has seriously impaired their usefulness.

The discovery has now been made that hydrophilic particulate polyacrylamides of the type described which contain in admixture therewith a small amount of a linear polyacrylamide chromic complex dissolve considerably more rapidly in hot neutral or alkaline water than do corresponding polymers which have no content of the complex. In preferred instances the improvement is very substantial and amounts to a decrease of 70% or more in the time previously believed necessary for the step.

The polyacrylamides benefited by the present invention include polyacrylamide itself and copolymers of at least 85 parts by weight of acrylamide with vinyl monomers copolymerizable therewith, for example acrylic acid, 2-vinyl-pyridine, diethylaminoethylacrylate quaternized with methyl chloride, and trimethyl vinyl phenyl ammonium chloride. The polyacrylamides further include the water-soluble hydrolysis products of acrylonitrile which contain the equivalent of at least 85% by weight of combined acrylamides. These polymers may contain hydrophobic components, but the proportion of hydrophobic components present is so small that the polymers as a whole are hydrophilic.

The product of the present invention is thus a complex of a hydrophilic particulate polyacrylamide containing at least 85% by weight of combined acrylamide with trivalent chromium as water-solubilizing agent.

The polyacrylamides benefited may have molecular weights from the customary range of 50,000–500,000 to in the range of 5 to 12 million or more recently made available. Their particle size may be in the range of 10 to 200 mesh or finer, best results generally being obtained with polyacrylamides in about the 50–100 mesh range. The term "mesh" refers to screen apertures per inch.

Particulate polyacrylamide can be made by crushing or grinding solvent-dried polyacrylamide to about −10 mesh size. The resulting coarse powder contains polyacrylamide dust, which rises and becomes visible when a bottle partially filled with the powder is shaken against a black background. The dust remains in suspension when the coarse particles settle. This dust plays a significant part in retarding the rate at which the large particles dissolve; the dust particles when wet transform themselves very quickly into gel particles. These particles act as an adhesive which binds the larger particles together, thereby hindering access of water thereto.

The polyacrylamide-chromic complexes of the present invention are conveniently prepared by forming a treating solution comprising a major amount of an organic liquid which is a non-solvent for the polyacrylamide, a small amount of a water-soluble salt of trivalent chromium as treating agent, and a minor amount of water as swelling agent for the polymer and as solvent for the chromic salt. The polyacrylamide is slurried or otherwise contacted with the treating solution until its rate of water-solubility (as determined by tests such as shown in the examples) has been improved to desired extent by the action of the chromic salt in forming a hydrophilic complex, after which the treating solution is drained off and, if desired, the polymer is dried.

The product is a dry hydrophilic polyacrylamide having a combined (i.e., reacted) acrylamide content of at least 85% by weight and having in admixture therewith an effective amount of a hydrophilic polyacrylamide-chromic complex as water-solubilizing agent.

The improvement in water-solubility is believed due to formation of a hydrophilic linear polyacrylamide-chromic chromium complex in the outer portion of the particles. This complex, I have found, dissolves more slowly than the central part of the particles. The evidence, therefore, is that the improvement in solubility afforded by the present invention resides in providing polyacrylamide particles with a surface or "rind" which dissolves slowly and which therefore becomes adhesive more slowly than would otherwise be the case, so that the particles possess less tendency to adhere or clump when wet with water. The result of this is that a greater surface area of the particles is exposed to the action of the water, with a consequently higher average rate of solution. It is known that exposure of the polyacrylamide to the treating solution for too long a time is detrimental to water-dispersibility as evidently the chromic salt then acts as cross-linking agent, but the present invention does not depend on whether this explanation is correct.

In the process, methanol is preferred as the carrier liquid for the chromic salt because this liquid is a non-solvent for the polymer and yet is capable of carrying satisfactorily large amounts of water and the chromic salt. In its place any lower alkanol (for example, ethanol or butanol) may be used, and evidently volatile ether alcohols and thiols may be used for the purpose. The amount of water present in the treating solution should be sufficient to swell the polymer particles so as to render the surface thereof receptive to complexing with the chromic salt. The amount in any instance is readily found by trial and in general is from 25% to 100% of the weight of the polyacrylamide.

The amount of chromic salt present in the treating solution should be sufficient to effect a substantial improvement in the water-solubility or water dispersibility of the particular polyacrylamide being treated and is advantageously roughly 0.1% to 1% of the salt on the weight of the polymer in the case of hydrated salts of monobasic acids such as chromic chloride, bromide, acetate and nitrate. The chromic salt may be preformed, or may be formed in situ, for example by reduction of the chromium in sodium bichromate with formaldehyde in the presence of hydrochloric acid.

An excess of chromic salt in the solution over that actually needed to form the desired amount of polymer is often preferred, as this permits the treatment to be accomplished in less time. The duration of the treatment depends chiefly on the particle size of the polymer and on the amount of improvement desired, and can be most conveniently determined in any instance by laboratory trial as shown below.

The polymer itself after treatment with the chromic salt solution for the purposes of the present invention contains less than about 1% by weight of chromium, and preferably contains about 0.005% to 0.05% by weight of chromium.

When sufficient of the chromic salt has complexed to render the particles more rapidly water-dispersible, the polyacrylamide is then ready for use; in general, the treatment is complete when a linear polyacrylamide chromic chromium complex has formed and before cross-linking begins. The treating solution is drained off, after which the polyacrylamide may be dried to a free-flowing powder.

If desired, the process may be performed by preparing an aqueous solution of vinyl monomeric mixture containing at least 85% acrylamide by weight and subjecting the mixture of redox polymerization in the presence of a small amount of the water-soluble chromic salt. The polymer is recovered in any convenient way, preferably by addition of a water-soluble lower anhydrous alkanol which precipitates the polymer in finely-divided form. The reaction of the chromic salt thus takes place concurrently with the polymerization.

The invention does not depend on the use of any particular chromic salt as solubilizing agent. In addition to those mentioned above, the water-soluble hydrated forms of chromic sulfate and chromic phosphate can be used.

The invention is illustrated by the examples which follow. These examples are preferred embodiments of the invention and are not to be construed as limitations thereon.

Example 1

The following illustrates the treatment of polyacrylamide with a chromic salt as solubilizing agent according to the present invention showing the improvement imparted to polyacrylamide of different particle size ranges.

Into laboratory beakers are placed 10 g. samples of substantially non-ionic polyacrylamide of Staudinger molecular weight of approximately 5,000,000 which have been passed through a hammer mill and screened to the mesh size shown in the table below, Staudinger's molecular weight is calculated by the formula $M = 1.4 \times 10^5 [\eta]^{3/2}$, wherein M is the weight average molecular weight and $[\eta]$ is the intrinsic viscosity of the polymer at 30° C. as a 0.1% to 0.01% solution in 1.0 N aqueous NaCl, as is shown in Reynolds et al., U.S. Patent No. 3,076,740, granted February 5, 1963. There is then added with stirring to each beaker 35 cc. of methanol, followed by 7 cc. of water containing 0.025 g. of chromic chloride ($CrCl_3 \cdot 6H_2O$). Stirring is continued for 30 minutes at room temperature.

There is then added to each beaker 80 cc. of methanol, the liquid phase is filtered off, and the treated polyacrylamide samples are dried. The products are free-flowing granular powders.

The resulting polyacrylamide samples are tested for solubility in comparison with untreated polyacrylamide of the same particle size by slowly stirring one gram of each polyacrylamide with 99 cc. of water at 60° C. and pH 9 and noting the approximate number of minutes needed for the particles to disappear. Results are as follows:

| Run | Polyacrylamide | | Minutes to Dissolve |
|---|---|---|---|
| | Description | Mesh | |
| 1 | Control | −10 +24 | 252 |
| 2 | Treated | −10 +24 | 150 |
| 3 | Control | −24 +48 | 75 |
| 4 | Treated | −24 +48 | 30 |
| 5 | Control | −48 +65 | 75 |
| 6 | Treated | −48 +65 | 20 |

The control (untreated) particles tend to clump together and form gels.

The results show that the presence of the chromic complex in the polymer decreased the dissolution time by about 40% to 75%.

Example 2

The foregoing is repeated (a) with a copolymer of 90 parts of weight of acrylamide and 10 parts by weight of acrylic acid and (b) with a polymer formed of $$-CH_2CH(CONH_2)-$$

and $-CH_2-CHNH_2-$ linkages in 95:5 molar ratio.

The treated polymers possess substantially improved dispersibility in water.

The control (untreated) particles tend to clump together and thereby to form gelatinous aggregates about ⅛" in diameter. The particles which have been treated with the chromium display no tendency to clump together.

Example 3

The following illustrates the preparation of polyacrylamide of improved dispersibility by homopolymerizing acrylamide in the presence of a small amount of a chromic salt.

To a 500 ml. 3-necked flask thermometer, equipped with stirrer and condenser is added 300 ml. of a 10% by weight solution of acrylamide in water, and the pH of the mixture is adjusted to 1.5 with phosphoric acid. The mixture is heated to 60° C. and 0.3 g. of ammonium persulfate and 0.003 g. of sodium metabisulfite are added with stirring. There is then added 0.06 g. of $CrCl_3 \cdot 6H_2O$ and stirring is continued until the material becomes too viscous to be stirred. The solution is then allowed to stand for four hours at 60° C., cooled to room temperature, and diluted to 3% solids with water.

Methanol is then slowly added until substantially all the polymer precipitates.

The precipitate is a fine powder which is recovered by filtration and drying and which dissolves more rapidly in hot alkaline water than standard polyacrylamide containing no chromium.

Example 4

The procedure of Example 3 is repeated except that an equal weight of chromic acetate [$Cr(C_2H_3O_2)_3 \cdot H_2O$] is used in place of the chromic chloride.

Substantially the same product is obtained.

Example 5

The procedure of Example 3 is repeated except that 0.03 g. of chromic sulfate $Cr_2(SO_4)_3 \cdot 5H_2O$ is used in place of the chromic chloride.

Substantially the same product is obtained.

Example 6

The procedure of Example 3 is repeated except that 0.9 ml. of tanning solution containing 0.02% $Cr^{+++}$ by weight is used in place of the chromic chloride. Substantially the same product is obtained.

The tanning solution is prepared by mixing together 5 g. of sodium dichromate $Na_2Cr_2O_7 \cdot 2H_2O$, 48 ml. of 10% aqueous HCl, 4.1 ml. of 37% aqueous formaldehyde and 1.5 ml. of water, allowing the mixture to stand for one hour, and diluting the mixture to 20% solids with water.

*Example 7*

The following illustrates another method of producing a polyacrylamide according to the present invention which dissolves rapidly.

To 120 ml. of methanol in a beaker are added with stirring first 30 g. of polyacrylamide containing a few carboxyl groups ground and screened to 100%—100 mesh and 30 g. of water containing 0.087 g. of $CrCl_3 \cdot 6H_2O$ to swell the particles. The mixture is stirred for 12 minutes at room temperature, and 240 ml. of methanol are added to harden the particles. The liquid phase is filtered off and the treated polyacrylamide is washed with methanol and dried.

To 50 g. of water is added with stirring 0.5 g. of the dried polyacrylamide thus obtained, followed by 1.0 ml. of 0.1 N NaOH solution (equal to 0.004 g. of 0.1 N NaOH solution). The polyacrylamide dissolves in about one minute. The pH of the resulting solution is 9.2.

I claim:

1. Process for treating a hydrophilic particulate polyacrylamide having a combined acrylamide content of at least 85% by weight to improve its dispersibility in alkaline water, which comprises contacting said polyacrylamide with a lower alkanol containing water as swelling agent and a water-soluble chromic salt until an effective amount of said chromic salt, equivalent to less than 1% of chromium based on the weight of said polyacrylamide has reacted with said polyacrylamide as alkaline water-solubilizing agent and drying the thus-treated polyacrylamide.

2. A process according to claim 1 wherein the polyacrylamide which is treated contains polyacrylamide dust.

3. Process according to claim 2 wherein the chromic salt is chromic chloride.

4. Process according to claim 1 wherein the alkanol is methanol.

5. Process for the preparation of a hydrophilic particulate polyacrylamide of improved dispersibility alkanol water which comprises subjecting a water-soluble vinyl monomeric mixture containing at least 85% acrylamide by weight to redox polymerization in aqueous medium in the presence of a small amount of a water-soluble chromic salt as alkaline water-solubilizing agent for the polyacrylamide which forms until the monomeric mixture has polymerized to alkanol-insoluble state, and at least a part of the chromium in said salt has reacted with said polyacrylamide, the amount of chromium which so reacts being less than 1% of the weight of the polyacrylamide, and recovering the said polyacrylamide in dry, finely-divided form.

6. Process for treating hydrophilic particulate polyacrylamide to improve its dispersibility in alkaline water which comprises contacting said polyacrylamide with a lower alkanol containing water as swelling agent and a water-soluble chromic salt until an effective amount of said chromic salt, equivalent to less than 1% chromium based on the weight of said polyacrylamide, has reacted with said polyacrylamide as alkaline water-solubilizing agent, and drying the thus-treated polyacrylamide.

References Cited by the Examiner
UNITED STATES PATENTS
3,114,651 12/1963 Gentile _____ 117—6

JOSEPH L. SCHOFER, *Primary Examiner.*